US008660030B2

(12) United States Patent
Sundaresan et al.

(10) Patent No.: US 8,660,030 B2
(45) Date of Patent: Feb. 25, 2014

(54) HIGH PERFORMANCE AND LOW COMPLEXITY SCHEDULING METHOD FOR ADAPTIVE RESOURCE USAGE IN OFDMA WIRELESS RELAY NETWORKS

(75) Inventors: Karthikeyan Sundaresan, Howell, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 277 days.

(21) Appl. No.: 13/192,878

(22) Filed: Jul. 28, 2011

(65) Prior Publication Data
US 2012/0026932 A1   Feb. 2, 2012

Related U.S. Application Data

(60) Provisional application No. 61/368,402, filed on Jul. 28, 2010.

(51) Int. Cl.
*H04L 12/28* (2006.01)
*H04J 1/16* (2006.01)

(52) U.S. Cl.
USPC ........................................................ 370/252

(58) Field of Classification Search
USPC .............................................. 370/252, 430
See application file for complete search history.

(56) References Cited

U.S. PATENT DOCUMENTS

2008/0267126 A1*  10/2008  Vujcic et al. .................. 370/330
2010/0027450 A1*   2/2010  Montojo et al. ............... 370/311

* cited by examiner

*Primary Examiner* — John Pezzlo
(74) *Attorney, Agent, or Firm* — Akitaka Kimura; Joseph Kolodka

(57) ABSTRACT

A method for scheduling transmissions in wireless network includes receiving information ranging from conventional data to real-time streaming applications into a basestation of an OFDMA wireless relay network and scheduling transmission of the information from the basestation by influencing adaptive frame segmentation and access hop reuse in the transmission of the information for achieving higher transmission flow of the information, Where the scheduling is formulated as an integer program, the scheduling includes solving a linear programming relaxation of the integer program and rounding to integral allocations with allocation to at least one of a subset of wireless users and subsets of relays in the network for obtaining frame segmentation and reuse. Where the scheduling is formulated by following a bisection approach to guide adaptation of the frame segmentation, the scheduling determines a subset of users with maximum flow per unit resource for a given frame segmentation and the resulting flow from current and previous scheduling being used to guide adaptation of frame segmentation towards convergence.

15 Claims, 4 Drawing Sheets

HIGH PERFORMANCE AND LOW COMPLEXITY SCHEDULING METHOD FOR ADAPTIVE RESOURCE USAGE IN OFDMA WIRELESS RELAY NETWORKS

This application claims the benefit of U.S. Provisional Application No. 61/368,402, entitled, "Scheduling Algorithms for Adaptive Resource Usage in OFDMA Relay Networks", filed Jul. 28, 2010, of which the contents of both are incorporated herein by reference.

BACKGROUND OF THE INVENTION

The present invention relates generally to broadband and wireless communications and more particularly to a scheduling method for adaptive resource usage in orthogonal frequency-division multiple access OFDMA wireless relay networks.

There has been an increasing demand to provide ubiquitous mobile access for a multitude of services ranging from conventional data to real-time streaming applications. To meet such requirements, existing cellular systems need enhancement to provide improved data rates and connectivity. Adding less sophisticated and less expensive "relay" stations (RS) to the network helps improve the throughput and coverage in the network.

Unlike conventional cellular networks, the throughput performance of relay networks is closely tied to maximizing the network flow (throughput capacity) over the two hops of the network. This is however dependent on how well the available OFDMA resources are utilized on the two hops of the network. The upcoming relay standards in next generation broadband access technologies like WiMAX allow for two design features to accomplish this: (i) adaptive frame segmentation, and (ii) access hop reuse. While prior art has focused on designing scheduling algorithms for leveraging diversity and reuse across hops, they have not focused on designed scheduling methods that optimize adaptive frame segmentation and reuse within the access hop to efficiently utilize OFDMA resources.

Prior scheduling works in OFDMA relays have focused largely on leveraging diversity gains. One prior work considered spatial reuse across relay and access hops, but did not consider reuse within the access hop. Further, none of these works have studied the impact of adaptive frame segmentation coupled with access hop reuse on the network capacity through design of efficient scheduling algorithms with performance guarantees.

Accordingly, there is a need for an improved unicast throughput performance of relay-assisted OFDMA cellular networks through efficient usage of OFDMA resources.

BRIEF SUMMARY OF THE INVENTION

The invention is directed to a method for scheduling transmissions in wireless network including receiving information ranging from conventional data to real-time streaming applications into a basestation of an OFDMA wireless relay network; and scheduling transmission of the information from the basestation by influencing adaptive frame segmentation and access hop reuse in the transmission of the information for achieving higher transmission flow of the information, the scheduling including where the scheduling is formulated as an integer program, solving linear programming relaxation of the integer program with allocation to at least one of subset of wireless users and subsets of relays in the network for obtaining a fractional frame segmentation, where the scheduling is formulated by following a bisection approach to guide adaptation of the frame segmentation, the scheduling determining a bottleneck in the scheduling transmission for a given fractional frame segmentation and the resulting flow from current and previous scheduling being guided for adaptation towards convergence.

These and other advantages of the invention will be apparent to those of ordinary skill in the art by reference to the following detailed description and the accompanying drawings.

DETAILED DESCRIPTION

The present invention is directed to the problem of designing scheduling methods to optimize frame segmentation and access hop reuse, which is a non-deterministic polynomial-time (NP) hard problem. Hence, the invention provides for an efficient scheduling method with good worst-case performance guarantees and near-optimal performance in practice. It also provides a simple greedy process with good performance that makes it conducive for implementation at the base station Referring now FIG. 1A, a basestation BS scheduler, responsive to user rates, provides a transmission schedule based on adaptive frame segmentation and access hop reuse. The scheduler employs an LP-based scheduler with high performance LSAR1 (100) detailed in FIG. 1, an LP-based scheduler with low complexity LSAR2 (200) detailed in FIG. 2, and a greedy scheduler GSAR (300) detailed in FIG. 3. For purposes of discussion, LP denotes linear programming and SAR denotes per-frame scheduling for adaptive resource usage and LSAR denotes linear programming schedule for adaptive resource usage.

Figure 1:
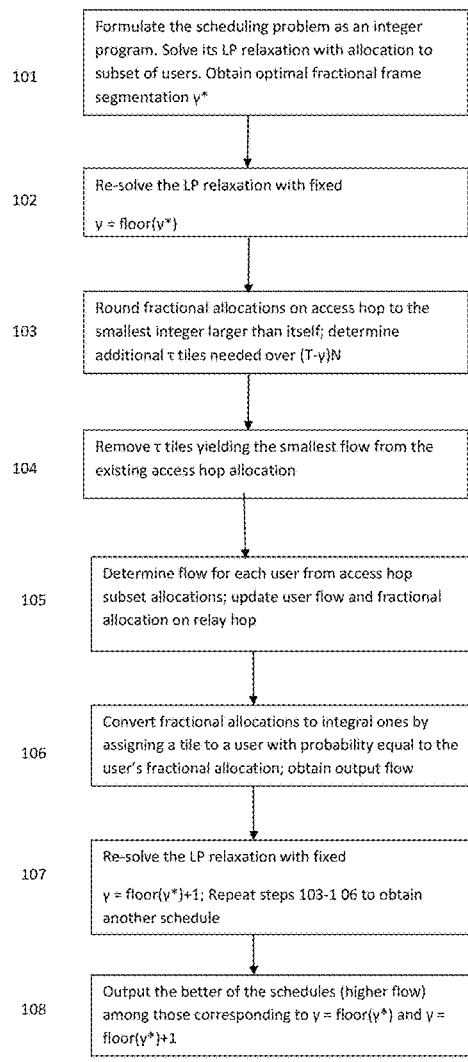
FIG. 1 is a diagram of an linear programming (LP)-based scheduler with high performance LSAR1 component 100 with high performance, in accordance with the invention.
Figure 1A:
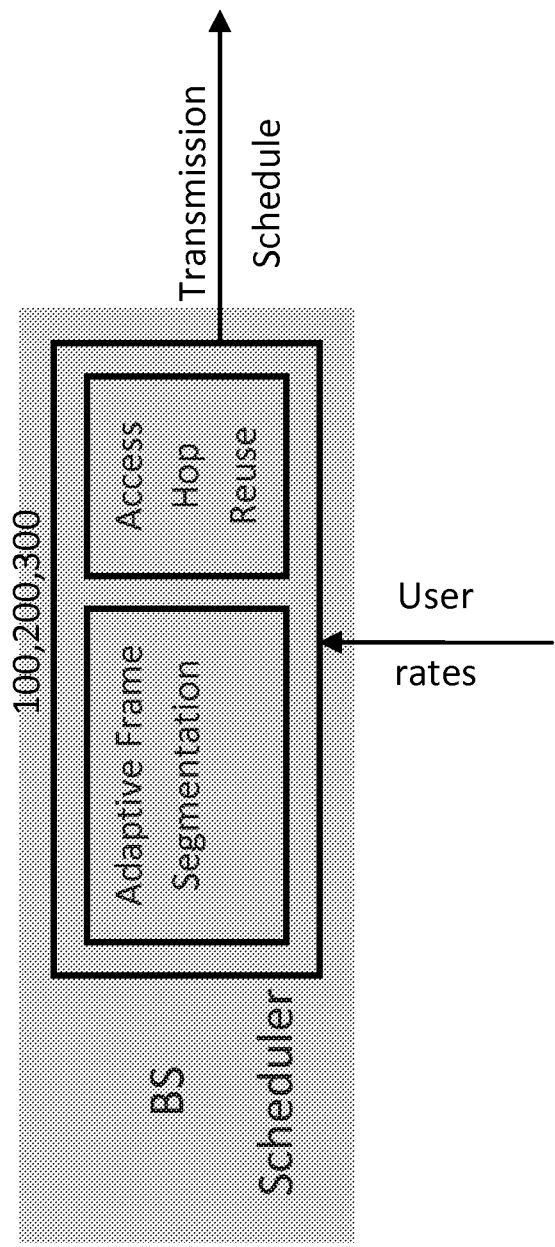
FIG. 1A is a block diagram representing adaptive resource usage scheduler with scheduling components 100, 200, and 300 at a basestation, in accordance with the invention.

Referring now to FIG. 1, diagram for the LP-based scheduler with high performance LSAR1 (100), the scheduling problem is formulated as an integer program using subset allocation as variables 101.

$$PSAR: \text{Maximize} \sum_{s=1}^{|S|} F_s$$

$$\text{s.t.,} \quad \sum_{k \in s} w_{k,s}^{rel} X_s \geq F_s; \forall s \in S$$

$$\sum_{k \in s} w_{k,s}^{acc} Y_s \geq F_s; \forall s \in S$$

$$\sum_s X_s \leq \gamma N; X_s \in \{0, 1, \dots, \gamma N\}$$

$$\sum_s Y_s \leq (T - \gamma)N; Y_s \in \{0, 1, \dots, (T - \gamma)N\}$$

where, $\gamma \in \{0, 1, \dots, T\}$, $S = \{S_1 \times S_2 \dots \times S_R\}$ Where N and T are the total number of channels and time slots, resulting in NT tiles in total for allocation; Xs and Ys indicate the # tiles allocated to subset s on relay and access hops respectively; a subset corresponds to a set of users with at most one user being picked from each relay; Fs is the weighted flow obtained subset s, which is given by the minimum flow resulting from the relay and access hops; $S_i$ denotes the set of users associated with relay i (including a null user).

The weighted flow for a user in a subset (if user belongs to subset) on the access hop is given by: $w_{k,s}^{acc} = w_k r_{k,s}^{acc}$, where $w_k$ is the weight of the user taking into account fairness and quality of service QoS, while $r_{k,s}^{acc}$ is the rate of the user in the presence of interference from other users in the subset who will be scheduled in tandem with the user, reusing the same allocated tiles.

The weighted flow for a user in a subset (if user belongs to subset) on the relay hop is given by: determining the relative fraction of time a user needs to be active in the subset on the relay hop to deliver a given flow from the access hop:

$$w_{k,s}^{rel} = \frac{w_{k,s}^{acc}}{\sum_{j \in s} \frac{w_{j,s}^{acc}}{w_j^{rel}}},$$

where $w_{k,s}^{acc} = w_k r_{k,s}^{acc}$.

Solve the LP relaxation of the above integer program to obtain optimal fractional frame segmentation $\gamma^*$.

Then the scheduler 102 re-solves the LP relaxation of the above integer program with fixed integral $\gamma = \text{floor}(\gamma^*)$. Let output be Xs* and Ys*.

The scheduler continues 103 to round fractional allocations on access hop to the smallest integer larger than itself: $\hat{Y}_s = \lceil Y_s^* \rceil$, $\forall s$; determine additional $\tau$ tiles needed over $(T-\gamma)N$: $\tau = \Sigma_s \hat{Y}_s - (T-\gamma l)N$ store corresponding subsets in $\Gamma: [\Gamma(1), \ldots, \Gamma(\tau)]$ The scheduler 104 removes $\tau$ tiles yielding the smallest flow from the existing access hop allocation: $\Gamma: \hat{Y}_s = \hat{Y}_s - 1$, $\forall s \in \Gamma$.

The scheduler 105 determines flow for each user from access hop subset allocations; update user flow and fractional allocation on relay hop. The scheduler updates relay hop and allocation for each subset and user according to:

$$X_s^* = \frac{\min\left\{F_s^*, \sum_{k \in s} w_{k,s}^{acc} \cdot \hat{Y}_s\right\}}{\sum_{k \in s} w_{k,s}^{rel}}, \forall s; Z_k^* = \frac{\sum_{s:k \in s} w_{k,s}^{rel} X_s^*}{w_k^{rel}}, \forall k$$

The scheduler 106 converts fractional allocations to integral ones by assigning a tile to a user with probability equal to the user's fractional allocation; obtain output flow:

Let $Z_{k,I}^* = \lfloor Z_k^* \rfloor$, $Z_{k,Q}^* = Z_k^* - Z_{k,I}^*$.

Assign integral allocations to respective users: $\hat{Z}_k = Z_{k,I}^*$, $\forall k$.

With remaining $\eta$ tiles: $\eta = \gamma_l N - \Sigma_k Z_{k,I}^*$;

For $\eta$ tiles, assign a tile to user k: $\hat{Z}_k = \hat{Z}_k + 1$ with probability $Z_{k,Q}^*$.

Output flow: $C(\gamma_l) = \Sigma_k \min\{\hat{Z}_k; Z_k^*\} w_k^{rel}$

The scheduler 107 then re-solves the LP relaxation with fixed $\gamma = \text{floor}(\gamma^*)+1$; Repeat steps 103-106 to obtain another schedule. Lastly the scheduler 108 outputs the better of the schedules (higher flow) among those corresponding to $\gamma = \text{floor}(\gamma^*)$ and $\gamma = \text{floor}(\gamma^*)+1$.

Figure 2:
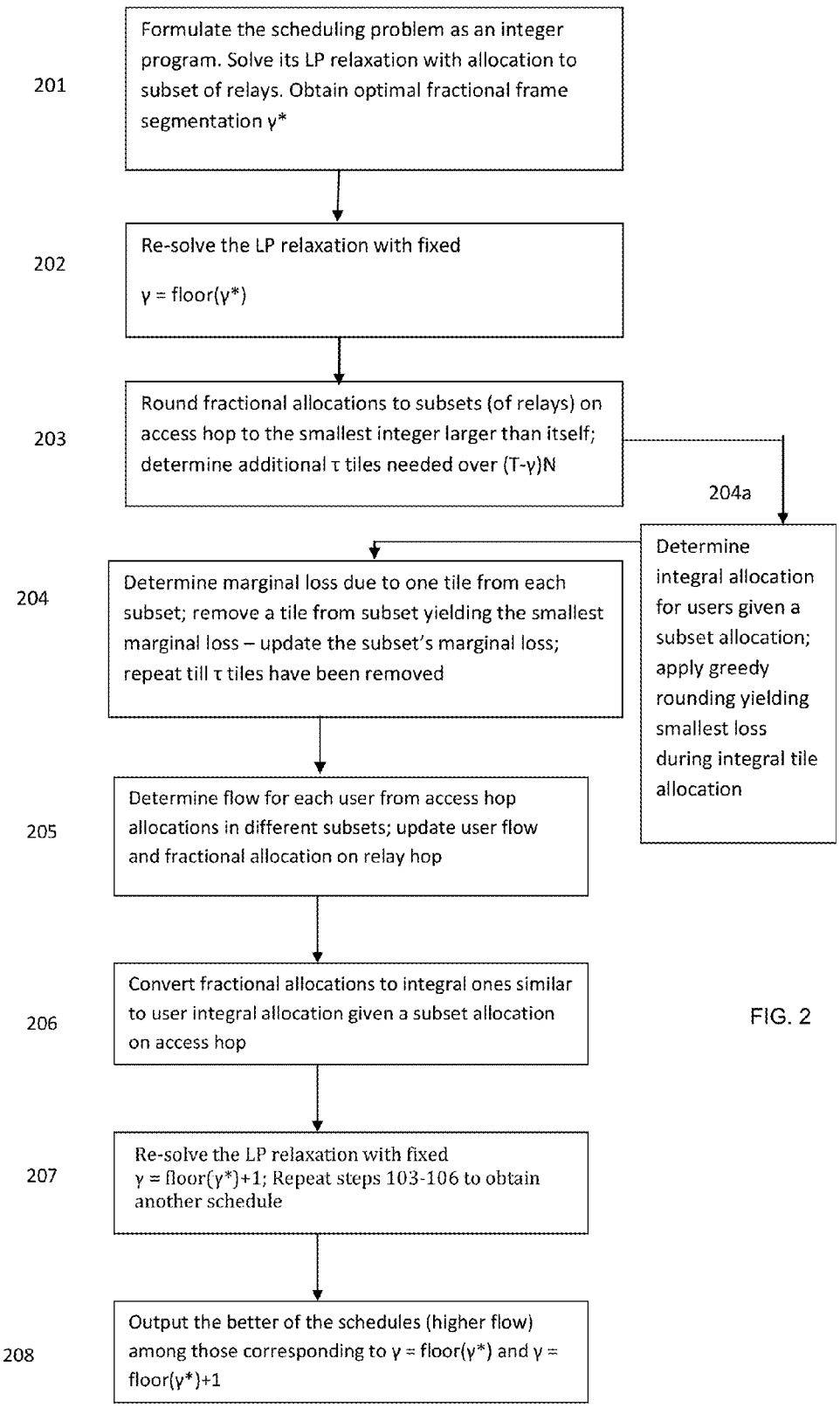
FIG. 2 is a diagram of an LP-based scheduler with low complexity LSAR2 component 200, in accordance with the invention.

Turning now to FIG. 2 diagram for the LP-based scheduler for adaptive resource usage with low complexity LSAR2 (200), the scheduler 201 formulates the scheduling problem as an integer program using both subset and user allocation as variables. CSAR denotes low complexity schedule of adaptive resource usage.

CSAR: Maximize $\sum_k F_k$ subject to, $w_k^{rel} X_k \geq F_k$; $\forall k$ $\sum_{a:R(k) \in s} w_{k,s}^{acc} Y_{k,s} \geq F_k$; $\forall k$ $\sum_k X_k \leq \gamma N$; $X_k \in \{0, 1, \ldots, \gamma N\}$ $\sum_{k:R(k)=r} Y_{k,s} \leq Y_s$; $\forall r \in s, \forall s \in \mathcal{R}$ $\sum_s Y_s \leq (T-\gamma)N$; $Y_s, Y_{k,s} \in \{0, 1, \ldots, (T-\gamma)N\}$.

where, $\gamma \in \{0, 1, \ldots, T\}$, $\mathcal{R} = \{\text{Subsets of relays}\}$ The key difference between the formulations in LSAR1 of FIG. 1 and LSAR2 of FIG. 2 is that LSAR2 considers only subsets of relays instead of subsets of users in LSAR1. This significantly reduces the # subsets and hence complexity from $O(K\hat{}R)$ to $O(R\hat{}R)$. However, for each subset allocation (Ys), there could be multiple users sharing the subset allocation within each relay in the subset (Y(k,s)).

The procedure to determine the optimal frame segmentation is similar to that in LSAR1. Hence, steps 201, 202, 207 and 208 are similar to steps 101, 102, 107 and 108. The difference lies in how the fractional allocations from the LP relaxation of the above formulation are converted to integral allocations. This is discussed in the following steps 203-206.

Step 203, the scheduler rounds fractional allocations to subsets of relays on access hop to the smallest integer larger than itself; determine additional $\tau$ tiles needed over $(T-\gamma)N$: $\hat{Y}_s = \lceil Y_s^* \rceil$, let $\hat{Z}_s = \hat{Y}_s$ rem $= \Sigma_s \hat{Y}_s - (T-\gamma)N$.

In step 204a the scheduler determines integral allocation for users given a subset allocation; apply greedy rounding yielding smallest loss during integral tile allocation. Integral allocation within each relay with $\hat{Y}_s$ as input: Output $\hat{Y}_{k,s}$, $\forall (k): R(k)=r$, $\forall r \in s$.

In step 204 the scheduler determines marginal loss due to one tile from each subset; remove a tile from subset yielding the smallest marginal loss—update the subset's marginal loss; repeat till $\tau$ tiles have been removed. Similarly obtain integral allocation with $\hat{Z}_s = \hat{Y}_s - 1$ as input: Output $\hat{Z}_{k,s}$, $\forall k: R(k)=r$, $\forall r \in s$. Determine flow loss from one tile: $\Delta L_s = \Sigma_{r \in s} \Sigma_{k:R(k)=r}(\hat{Y}_{k,s} - \hat{Z}_{k,s}) w_{k,s}^{acc}$. The remaining step 204 substeps include the following recursive sequence:

while rem=0 do
  Determine $\hat{s} = \arg\min_s\{\Delta L_s\}$
  Reduce $\hat{s}$ allocation by a tile: $\hat{Y}_{\hat{s}} = \hat{Y}_{\hat{s}} - 1$; Update rem=rem-1
  Update integral allocation for subset $\hat{s}$ with $\hat{Y}_{\hat{s}}$ as input: Output $\hat{Y}_{k,\hat{s}}$, $\forall k: R(k)=r$, $\forall r \in \hat{s}$
  Update integral allocation for $\hat{s}$ with $\hat{Z}_{\hat{s}} = \hat{Y}_{\hat{s}} - 1$ as input: Output $\hat{Z}_{k,\hat{s}}$, $\forall k: R(k)=r$, $\forall r \in \hat{s}$
  Update marginal loss for $\hat{s}$: $\Delta L_s = \Sigma_{r \in s} \Sigma_{k:R(k)=r}(\hat{Y}_{k,\hat{s}} - \hat{Z}_{k,\hat{s}}) w_{k,\hat{s}}^{acc}$ In step 205 the scheduler determines flow for each user from access hop allocations in different subsets; update user flow and fractional allocation on relay hop. Based on access hop integral flow, update relay hop user allocation per $$X_k^* = \frac{\min\left\{\sum_{s:R(k)\ni s} w_{k,s}^{acc} Y_{k,s}, F_k^*\right\}}{w_k^{rel}},$$

$\Delta k$; Update $\hat{X}_k = \lceil X_k^* \rceil$.

In step 206 the scheduler converts fractional allocations to integral ones similar to user integral allocation given a subset allocation on access hop. Obtain integral allocation by removing $\Sigma_k \hat{X}_k - \gamma N$ tiles the smallest flow value from $\{\hat{X}_k\}$.

Figure 3:
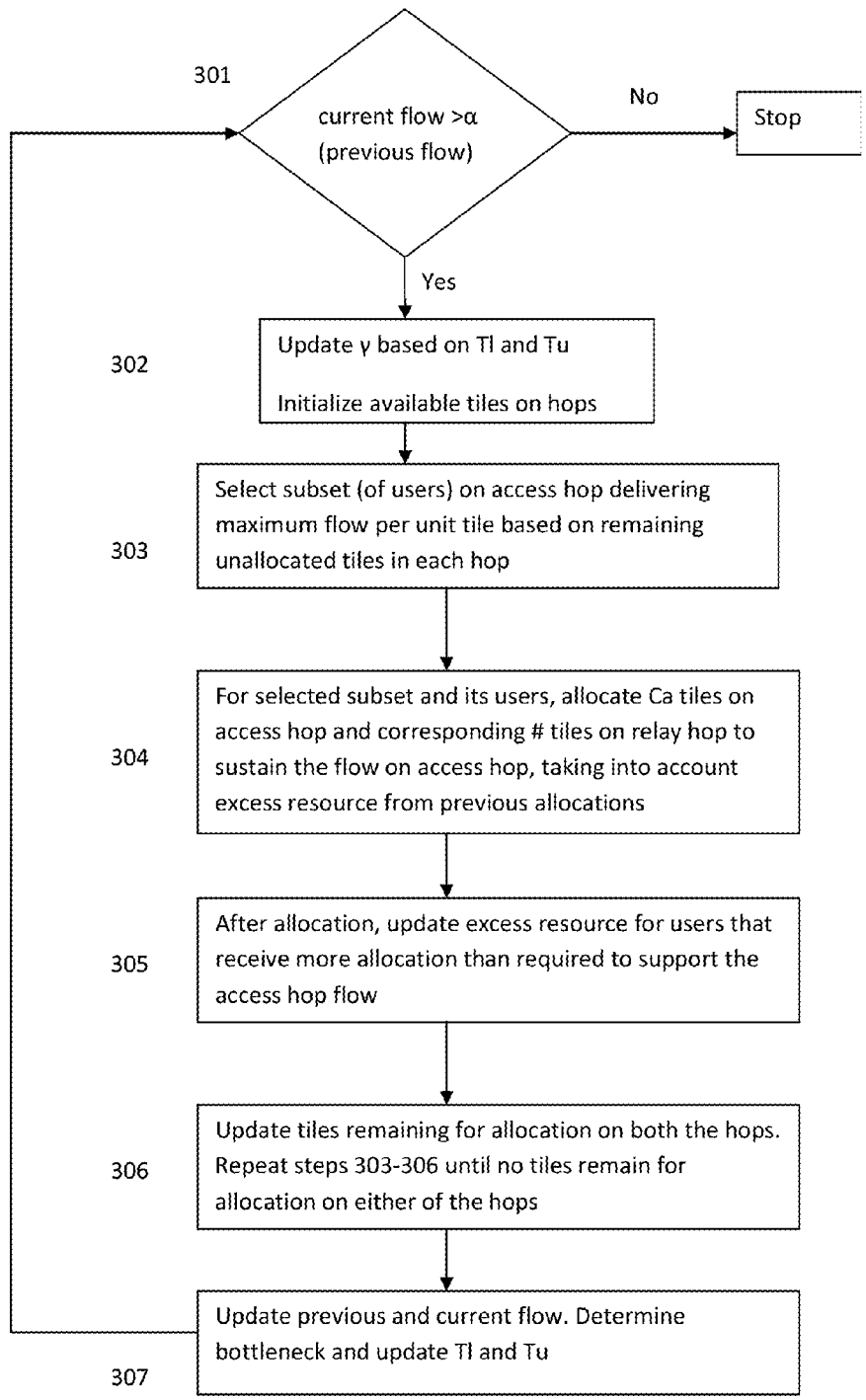
FIG. 3 is a diagram of a greedy scheduler GSAR component 300, in accordance with the invention.

Turning now to FIG. 3, diagram for the greedy scheduler for adaptive resource usage GSAR (300), steps 301, 302, 307 follow a bisection approach to guide the adaptation of frame segmentation. It determines the bottleneck hop for a given $\gamma$ and the resulting flow from current and previous schedules to guide the adaptation towards convergence. Sub-steps of 301 include:

--- while cur_flow ≥ α · prev_flow do $\gamma = t_l + \left\lfloor \frac{(t_u - t_l)}{2} \right\rfloor$, prev_flow = cur_flow Initialize available tiles for allocation on relay and access hops.
  $C_r = \gamma N$, $C_a = (T - \gamma)N$
Obtain the schedule and resulting flow for fixed $\gamma$
  if $C_r = 0$ then bot = 0 else bot = 1
  if bot = 0 then $t_l = \gamma$ else $t_u = \gamma$
end while

---

In step 303 the GSAR considers only subsets of relays and for every relay subset, it determines a corresponding subset of users as follows.

$\mathcal{R} = \{\text{Subset of relays}\}$

Map $\mathcal{R} \to \mathcal{R}_m$: $\forall s = \{r_1, \ldots, r_p\} \in \mathcal{R}$ define $m_s =$ $\{k_1, \ldots, k_p\}$ where $k_i = \text{argmax}_{k:R(k)=r_i}\left\{\frac{w_k^{rel} w_{k,s}^{acc}}{w_k^{rel} + w_{k,s}^{acc}}\right\}$ Then it selects the subset (of users) on access hop delivering maximum flow per unit tile based on remaining unallocated tiles in each hop.

---

Determine access flow from $c_a$ (min$\{a, C_a\}$) tiles for
subset s: $f_s^{acc} = \Sigma_{k \in m_s} f_{k,s}^{acc} = \Sigma_{k \in m_s} c_a w_{k,s}^{acc}$
Obtain tiles on relay hop to support $f_s^{acc}$ flow: $c_{s,r} =$ $\Sigma_{k \in m_s}\left[c_a \cdot \frac{w_{k,s}^{acc}}{w_k^{rel}} - E_k\right]$ if $c_{s,r} \le C_r$ then $f_s^{rel} = \Sigma_{k \in m_s} f_{k,s}^{rel} = \Sigma_{k \in m_s}\left[c_a \cdot \frac{w_{k,s}^{acc}}{w_k^{rel}} - E_k\right] w_k^{rel}$ else
  Re-calculate user flow ($f_{k,s}^{rel} \le f_{k,s}^{acc}$) to maximize relay flow ($f_s^{rel}$) for given $c_{s,r} = C_r$ tiles end if Determine $\hat{s} = \arg\max_s \left\{\frac{\Sigma_{k \in m_s} \min\{f_{k,s}^{rel}, f_{k,s}^{acc}\}}{c_{s,r} + c_a}\right\}$.

---

In step 304 the GSAR, for selected subset and its users, allocates Ca tiles on access hop and corresponding # tiles on relay hop to sustain the flow on access hop, taking into account excess resource from previous allocations Access hop allocations: $Y_{k,\hat{s}} = Y_{k,\hat{s}} + c_a$, $\forall k \in m_{\hat{s}}$ Relay hop allocations: $X_k = X_k + \left\lceil \frac{f_{k,\hat{s}}^{rel}}{w_k^{rel}} - E_k \right\rceil \cdot \forall k \in m_{\hat{s}}$ In step 305, after allocation, the scheduler updates excess resource for users that receive more allocation than required to support the access hop flow $$\text{Update } E_k = \left\lceil \frac{f_{k,\hat{s}}^{rel}}{w_k^{rel}} - E_k \right\rceil - \left(\frac{f_{k,\hat{s}}^{rel}}{w_k^{rel}} - E_k\right)$$

In step 306, the GSAR Update tiles remaining for allocation on both the hops. Repeat steps 303-306 until no tiles remain for allocation on either of the hops.

$C_a = C_a - c_a$; $C_r = C_r - c_{\hat{s},r}$

From the foregoing it can be seen that the present invention provides a number of benefits: a near-optimal solution for adaptive frame segmentation and access hop reuse; an alternate solution that significantly reduces running time complexity compared to the previous solution, while also providing a good performance in practice; a greedy solution with fast running times and good average case performance; and applies to the case where users have both backlogged and finite buffers and also for the uplink.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for scheduling transmissions implemented in a basestation used in an orthogonal frequency-division multiple access (OFDMA) wireless relay network, the method comprising:
  receiving information ranging from conventional data to real-time streaming applications into said basestation; and
  scheduling transmission of said information from said basestation by influencing adaptive frame segmentation and access hop reuse jointly in said transmission of said information for achieving higher transmission flow of said information, wherein said scheduling is formulated as an integer program, said scheduling solving a linear programming relaxation of said integer program and rounding to integral allocations with allocation to at least one of a subset of wireless users and subsets of relays in said network for obtaining frame segmentation and reuse, and wherein said scheduling is formulated by following a bisection approach to guide adaptation of said frame segmentation, said scheduling determining a subset of users with maximum flow per unit resource for a given said frame segmentation and the resulting flow from current and previous said scheduling being used to guide adaptation of frame segmentation towards convergence.

2. The method of claim 1, wherein said scheduling comprises:
determining additional τ tiles needed over $(T-\gamma)N$, where N and T are the total number of channels and time slots; and
resulting in NT tiles in total for allocation, said determining being responsive to rounding fractional allocations of subsets of users or relays on access hop to the smallest integer larger than itself.

3. The method of claim 2, wherein said scheduling further comprises:
removing said τ tiles from subsets of users or relays yielding the smallest flow in transmission of said information.

4. The method of claim 2, wherein said scheduling further comprises:
determining marginal loss due to one said tile from each of subset of users or relays;
removing a tile from one subset of users or relays yielding a smallest marginal loss;
updating said subset's marginal loss and repeating said determining; and
removing and updating till all said tiles have been removed.

5. The method of claim 2, wherein said scheduling further comprises:
determining flow for each user in different access hop subset allocations and updating user flow and fractional allocation on said relay hop.

6. The method of claim 5, wherein said scheduling comprises:
based on access hop integral flow, updating relay hop user allocation per $$X_k^* = \frac{\min\left\{\sum_{s:R(k)\in s} w_{k,s}^{acc} Y_{k,s}, F_k^*\right\}}{w_k^{rel}},$$

∀k; Update $\hat{X}_k = \lceil X_k^* \rceil$,
where
$F_k^*$ is the flow for user k returned by LP relaxation solution,
$w_{k,s}^{acc}$ is the flow of user k in subset of relays (s) in access hop,
$w_k^{rel}$ is the flow of user k in relay hop,
$X_k^*$ is the updated relay hop flow for user k,
$\hat{Y}_{k,s}$ is the integral flow for user k in subset s in access hop, and
$\hat{X}_k$ is the rounded integral flow for user k in relay hop.

7. The method of claim 2, wherein said scheduling further comprises:
converting fractional allocations to integral ones by assigning a tile to a wireless user with probability equal to said user's fractional allocation to obtain an output flow.

8. The method of claim 1, wherein said scheduling comprises:
updating relay hop flow and allocation for each subset and user according to $$X_s^* = \frac{\min\left\{F_s^*, \sum_{k\in s} w_{k,s}^{acc} \cdot \hat{Y}_s\right\}}{\sum_{k\in s} w_{k,s}^{rel}}, \forall s; Z_k^* = \frac{\sum_{s:k\in s} w_{k,s}^{rel} X_s^*}{w_k^{rel}}, \forall k,$$

where
$\hat{Y}_s$ is the integral allocation for subset of users (s) from access hop,
$F_s^*$ is the flow for subset s returned by LP relaxation solution,
$w_{k,s}^{acc}$ is the flow of user k in subset s in access hop,
$w_{k,s}^{rel}$ is the flow of user k in subset s in relay hop,
$X_s^*$ is the updated relay hop flow for subset s, and
$Z_k^*$ is the updated relay hop flow for user k.

9. The method of claim 1, wherein said scheduling further comprises:
considering only subsets of relays, every relay subset determining a corresponding subset of users; and
for selected subset and its users allocating tiles on access hop and corresponding number of tiles on relay hop to sustain transmission flow on access hop, taking into account excess resource from previous allocations.

10. The method of claim 1, wherein said scheduling problem as an integer program using subset allocation as variables comprises the following:

$$PSAR: \text{Maximize} \sum_{s=1}^{|S|} F_s$$

$$\text{s.t.,} \sum_{k\in s} w_{k,s}^{rel} X_s \geq F_s; \forall s \in S$$

$$\sum_{k\in s} w_{k,s}^{acc} Y_s \geq F_s; \forall s \in S$$

$$\sum_s X_s \leq \gamma N; X_s \in \{0, 1, \ldots, \gamma N\}$$

$$\sum_s Y_s \leq (T-\gamma)N; Y_s \in \{0, 1, \ldots, (T-\gamma)N\}.$$

where, $\gamma \in \{0, 1, \ldots, T\}, S = \{S_1 \times S_2 \ldots \times S_R\};$ N and T are the total number of channels and time slots, resulting in NT tiles in total for allocation,
Xs and Ys indicate the numbers of tiles allocated to subsets on relay and access hops respectively, a subset corresponding to a set of users with at most one user being picked from each relay,
Fs is the weighted flow obtained subsets, which is given by the minimum flow resulting from the relay and access hops, weighted flow for a user in a subset (if user belongs to subset) on the access hop being given by $w_{k,s}^{acc} = w_k r_{k,s}^{acc}$, where $w_k$ is the weight of the user taking into account fairness and QoS, while $r_{k,s}^{acc}$ is the rate of the user in the presence of interference from other users in the subset who will be scheduled in tandem with the user, reusing the same allocated tiles, and
γ is the number of time symbols out of T in a frame that is allocated for relay hop transmission.

11. The method of claim 1, wherein a weighted flow for a user in a subset (if user belongs to subset) on the relay hop is given by determining the relative fraction of time a wireless user needs to be active in the subset on the relay hop to deliver a given flow from the access hop:

$$w_{k,s}^{rel} = \frac{w_{k,s}^{acc}}{\sum_{j \in s} \frac{w_{j,s}^{acc}}{w_j^{rel}}},$$

where $w_k$ is the weight of the user k taking into account fairness and quality of service QoS, while $r_{k,s}^{acc}$ is the rate of the user in the presence of interference from other users in the subset who will be scheduled in tandem with the user, reusing the same allocated tiles.

12. The method of claim 1, wherein said scheduling problem as an integer program using both subset and user allocation as variables comprises the following:

$$\text{CSAR: Maximize} \sum_k F_k$$

subject to, $w_k^{rel} X_k \geq F_k; \forall k$ $$\sum_{a:R(k) \in s} w_{k,s}^{acc} Y_{k,s} \geq F_k; \forall k$$

$$\sum_k X_k \leq \gamma N; X_k \in \{0, 1, \ldots, \gamma N\}$$

$$\sum_{k:R(k)=r} Y_{k,s} \leq Y_s; \forall r \in s, \forall s \in \mathcal{R}$$

$$\sum_s Y_s \leq (T-\gamma)N; Y_s, Y_{k,s} \in \{0, 1, \ldots, (T-\gamma)N\}$$

15:

where, $\gamma \in \{0, 1, \ldots, T\}$, $\mathcal{R} = \{\text{Subsets of relays}\}$;

N and T are the total number of channels and time slots, resulting in NT tiles in total for allocation;
Xs and Ys indicate the numbers of tiles allocated to subset s on relay and access hops respectively, a subset corresponding to a set of users with at most one user being picked from each relay;
Fs is the weighted flow obtained subset s, which is given by the minimum flow resulting from the relay and access hops, weighted flow for a user in a subset (if user belongs to subset) on the access hop being given by $w_{k,s}^{acc} = w_k r_{k,s}^{acc}$, where $w_k$ is the weight of the user taking into account fairness and QoS, while $r_{k,s}^{acc}$ is the rate of the user in the presence of interference from other users in the subset who will be scheduled in tandem with the user, reusing the same allocated tiles; and
$\gamma$ is the number of time symbols out of T in a frame that is allocated for relay hop transmission.

13. The method of claim 1, wherein said scheduling comprises determining a corresponding subset of users according to $\mathcal{R} = \{\text{Subset of relays}\}$ Map $\mathcal{R} \to \mathcal{R}_m$: $\forall s = \{r_1, \ldots, r_p\} \in \mathcal{R}$ define $m_s =$ $\{k_1, \ldots, k_p\}$ where $k_i = \text{argmax}_{k:R(k)=r_i} \left\{ \frac{w_k^{rel} w_{k,s}^{acc}}{w_k^{rel} + w_{k,s}^{acc}} \right\}$ R(k) is the relay with whom user k is associated;
$w_{k,s}^{acc}$ is the flow of user k in subset of relays (s) in access hop;
$w_k^{rel}$ is the flow of user k in relay hop;
$m_s$ is the subset of users corresponding to subset of relays in s.

14. The method of claim 1, wherein said scheduling determines subset (of users) on access hop delivering maximum flow per unit tile based on remaining unallocated tiles in each hop and comprises $$\hat{s} = \text{argmax}_s \left\{ \frac{\sum_{k \in m_s} \min\{f_{k,s}^{rel}, f_{k,s}^{acc}\}}{c_{s,r} + c_a} \right\},$$

where
$m_s$ is the subset of users corresponding to subset of relays in s;
$c_a$ is the number of tiles allocated in access hop;
$c_{s,r}$ is the number of tiles required on relay hop to support the same amount of flow supported by the subset s with $c_a$ tiles on the access hop; and
$f_{k,s}^{rel}, f_{k,s}^{acc}$ are the flow obtained by user k in subset s on the relay and access hops respectively.

15. The method of claim 14, wherein said allocating determines appropriate number of tiles to be allocated to users in the selected subset on relay and access hops and comprises Access hop allocations $Y_{k,\hat{s}} = Y_{k,\hat{s}} + c_a, \forall k \in m_{\hat{s}}$ Relay hop allocations $X_k = X_k + \left\lceil \frac{f_{k,\hat{s}}^{rel}}{w_k^{rel}} - E_k \right\rceil \cdot \forall k \in m_{\hat{s}}$ $$E_k \leftarrow \left\lceil \frac{f_{k,\hat{s}}^{rel}}{w_k^{rel}} - E_k \right\rceil - \left( \frac{f_{k,\hat{s}}^{rel}}{w_k^{rel}} - E_k \right),$$

where
$Y_{k,\hat{s}}$ is allocation to user k in selected subset $\hat{s}$ in access hop;
$w_k^{rel}$ is the flow of user k in relay hop;
$X_k$ is allocation to user k in relay hop;
$w_k^{rel}$ is the flow of user k in relay hop; and
$E_k$ is excess allocation received by user k in relay hop.

* * * * *